United States Patent
Huang et al.

(10) Patent No.: US 12,088,976 B2
(45) Date of Patent: Sep. 10, 2024

(54) STATE SWITCHING METHOD AND APPARATUS, DEVICE, AND STORAGE MEDIUM

(71) Applicant: ZTE Corporation, Shenzhen (CN)

(72) Inventors: Xingang Huang, Shenzhen (CN); Weiliang Zhang, Shenzhen (CN); Junshan Wei, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 53 days.

(21) Appl. No.: 17/794,668

(22) PCT Filed: Jan. 18, 2021

(86) PCT No.: PCT/CN2021/072519
§ 371 (c)(1),
(2) Date: Jul. 22, 2022

(87) PCT Pub. No.: WO2021/147819
PCT Pub. Date: Jul. 29, 2021

(65) Prior Publication Data
US 2023/0080315 A1 Mar. 16, 2023

(30) Foreign Application Priority Data
Jan. 22, 2020 (CN) .......................... 202010075339.3

(51) Int. Cl.
*H04Q 11/00* (2006.01)

(52) U.S. Cl.
CPC . *H04Q 11/0067* (2013.01); *H04Q 2011/0045* (2013.01)

(58) Field of Classification Search
CPC .................... H04Q 11/0067; H04Q 2011/0045
(Continued)

(56) References Cited

U.S. PATENT DOCUMENTS

| | | | | |
|---|---|---|---|---|
| 7,991,296 B1 * | 8/2011 | Johnston | ............... | H04J 3/0608 398/154 |
| 2011/0142437 A1 * | 6/2011 | Luo | ....................... | H04J 3/0608 398/1 |

(Continued)

FOREIGN PATENT DOCUMENTS

| | | |
|---|---|---|
| CN | 102195738 A | 9/2011 |
| CN | 104363531 A | 2/2015 |
| WO | 2018014161 A1 | 1/2018 |

OTHER PUBLICATIONS

International Search Report for corresponding application PCT/CN2021/072519 filed Jan. 18, 2021; Mail date Apr. 7, 2021.
(Continued)

*Primary Examiner* — Dalzid E Singh
(74) *Attorney, Agent, or Firm* — CANTOR COLBURN LLP

(57) ABSTRACT

Provided are a state transition method and apparatus, a device, and a storage medium. The method comprises: an optical network unit verifies a received physical synchronization sequence field, and transitions the current state according to a verification result. As such, the probability of downstream synchronization detection can be effectively improved, and the probability of missed downstream synchronization detection can be reduced, thereby ensuring the normal operation of a PON system.

15 Claims, 4 Drawing Sheets

(58) Field of Classification Search
USPC .......................................................... 398/154
See application file for complete search history.

(56) References Cited

U.S. PATENT DOCUMENTS

2012/0093513 A1* 4/2012 Luo ....................... H04J 3/0605
398/43
2021/0184771 A1* 6/2021 Strobel ................... H04L 1/004

OTHER PUBLICATIONS

European Search Report for corresponding application EP21744475; Report dated Jun. 16, 2023.
Futurewei, "50G-PON PSync Discussion". International Telecommunication Union, Study Period 2017-2020, Texas Jan. 9-10, 2019.
Futurewei, "50G-PONdownstream synchronization analysis". International Telecommunication Union, Study Period 2017-2020, Geneva, Jan. 27-Feb. 7, 2020.
Intel Corporation, "G.HSP: ONU Downstream Synchronization", International Telecommunication Union, Conference Call Dec. 17, 2019.
Series G: Transmission Systems and Media, Digital Systems and Networks, Gigabit-capable Passive Optical Networks (G-PON): Transmission Convergence Layer Specification, Mar. 2008.
ZTE Corporation, "50G PON downstream synchronization analysis", International Telecommunication Union, Online, Apr. 20-24, 2020.

* cited by examiner

STATE SWITCHING METHOD AND APPARATUS, DEVICE, AND STORAGE MEDIUM

CROSS-REFERENCE TO RELATED APPLICATION

The present disclosure claims priority to Chinese patent application No. CN202010075339.3, filed on Jan. 22, 2020, and entitled "State Transition Method and Apparatus, Device, and Storage Medium", the disclosure of which is hereby incorporated by reference in its entirety.

TECHNICAL FIELD

The disclosure relates to the technical field of communications, and more particularly, to a state transition method and apparatus, a device, and a storage medium.

BACKGROUND

A 10-Gigabit-capable Passive Optical Networks Optical Network Unit (XGPON ONU) allows a Physical Synchronization Sequence (PSync) field to have K=2 bit errors in a downstream synchronization state machine, i.e. when the number of error bits in 64 bits of the received PSync is less than or equal to 2, it is considered that the PSync is received, whereas it is considered that the PSync is not received. In addition, when entering a pre-sync state from a hunt state, PSync is required to be completely matched. Meanwhile, during the jump of states, it is required to determine not only whether a correct PSync is received, but also whether a correct Superframe Counter Structure (SFC) is received. Under the condition that a system pre-correction error rate (Pe) is 1e−3, accurate XGPON downstream synchronization can be ensured according to the above state jump condition, and the probability of a successful downstream synchronization is 93.79%. A false downstream synchronization loss occurs every 7.86 years (i.e. an average missed synchronization detection time is 7.86 years) on average. A false downstream synchronization occurs every 3.29E+43 years (i.e. an average missed synchronization detection time is 3.29E+43 years) on average.

However, for a high-speed Passive Optical Network (PON) system, in order to reduce optical link index requirements, the pre-correction error rate is relaxed to 1e−2, or even 2e−2. The implementation continues according to the above downstream synchronization method. The detection probability of downstream synchronization is very low, while the probability of missed detection is very high, thereby affecting the normal operation of the PON system.

SUMMARY

In order to solve at least one of the above technical problems, embodiments of the disclosure provide the following solutions.

Embodiments of the disclosure provide a state transition method, which may include the following steps: an ONU verifies a received PSync field; the ONU transitions a current state according to a verification result.

Embodiments of the disclosure provide a state transition apparatus, which may include: a verification module, configured to verify a received PSync field; and a transition module, configured to transition a current state according to a verification result.

Embodiments of the disclosure provide a device, which may include: a memory, a processor and a computer program that is stored on the memory and runnable on the processor. The processor, when executing the computer program, implements the state transition method provided in the embodiments of the disclosure.

Embodiments of the disclosure provide a computer-readable storage medium, which may store a computer program which, when executed by a processor, implements the state transition method provided in the embodiments of the disclosure.

With respect to the above embodiments and other aspects of the disclosure and implementations thereof, further description is provided in Brief Description of the Drawings, Detailed Description of the Embodiments, and Claims.

DETAILED DESCRIPTION OF THE EMBODIMENTS

In order to more clearly understand the objects, technical solutions and advantages of the disclosure, the embodiments of the disclosure are described below in combination with the accompanying drawings. It is to be noted that the embodiments in the disclosure and the features in the embodiments may be arbitrarily combined with each other without conflict.

In addition, in the embodiments of the disclosure, words such as "optionally" or "illustratively" are used to mean that there is an example, instance, or illustration. Any embodiment or design solution described as "optionally" or "illustratively" in embodiments of the disclosure should not be construed as being preferred or advantageous over other embodiments or design solutions. Exactly, the use of the words "optionally" or "illustratively" is intended to present relevant concepts in a specific manner.

Figure 1:
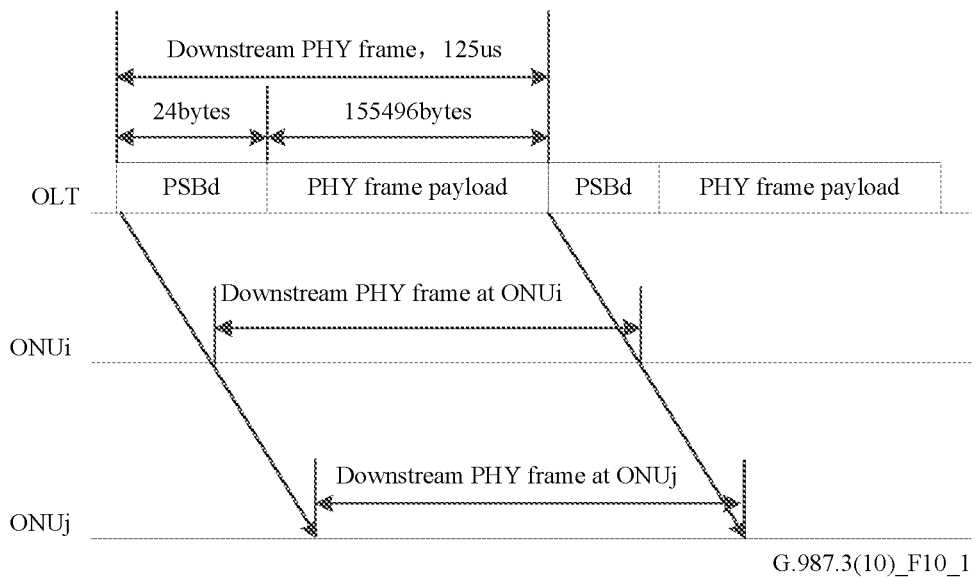
FIG. 1 is a schematic structure diagram of a downstream PHY frame according to an embodiment.
Figure 2:
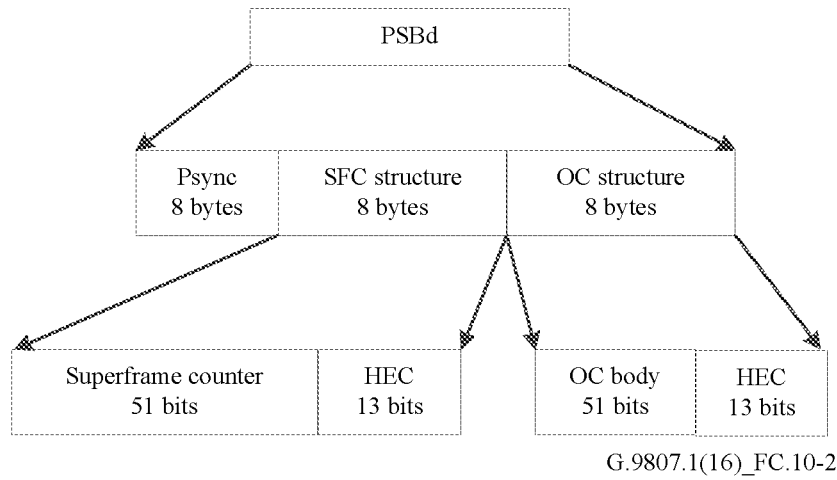
FIG. 2 is a schematic structure diagram of PSBd according to an embodiment.

In order to understand the solutions of embodiments of the disclosure, the description of concepts relevant to the disclosure is set forth illustratively in part for reference. As shown in the following:

Frame synchronization of a Gigabit-Capable PON (GPON) and an XGPON is realized by detecting PSync and superframe counter (SFC) in a downstream Physical Synchronization Field (PSBd), and the structures of PSBd, PSync and SFC are respectively shown in FIGS. 1 and 2.

The PSync contains a fixed 64-bit pattern, and the coding of the PSync field is 0xC5E5 1840 FD59 BB49. The ONU uses this sequence to achieve alignment at the downstream PHY frame boundary.

The SFC structure is a 64-bit field that contains a 51-bit SFC and a 13-bit Header Error Check (HEC) field. The SFC value in each downstream PHY frame is increased by 1 with respect to the previous PHY frame. Whenever the SFC reaches its maximum value (all ones), it is set to 0 on the following downstream PHY frame.

Figure 3:
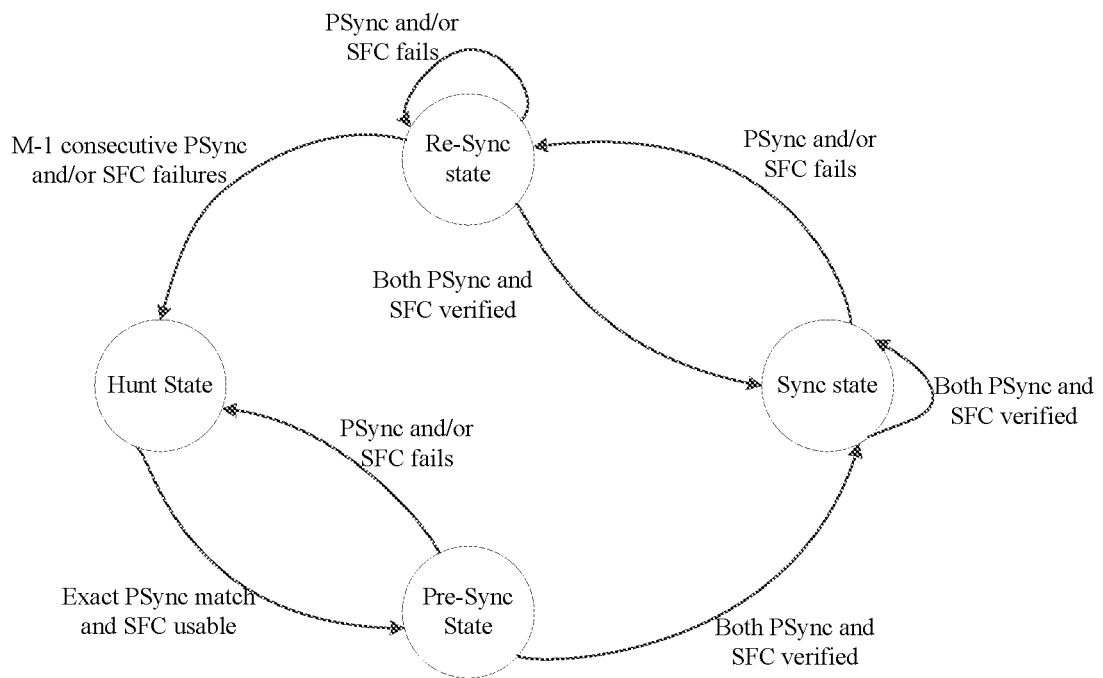
FIG. 3 is a schematic diagram of a conventional downstream frame synchronization state transition process according to an embodiment.

As shown in FIG. 3, a specific process of a downstream frame synchronization state machine as follows.

The ONU begins in the hunt state. While in the hunt state, the ONU searches for the PSync pattern in all possible alignments (both bit and byte) within the downstream signal. Once an exact match with the PSync pattern specified in clause 10.1.1.1 of the existing standard is found, the ONU verifies if the 64 bits immediately following the PSync pattern form a valid HEC-protected SFC structure. If the 64-bit protected SFC structure is uncorrectable, the ONU remains in the Hunt state and continues searching for a PSync pattern. If the 64-bit protected SFC structure is valid, the ONU stores a local copy of the SFC value and transitions into the Pre-Sync state.

Once the ONU leaves the Hunt state, it performs PSync and SFC verification on each subsequent PHY frame boundary (i.e., once every 155520 bytes) and executes a corresponding transition of the downstream synchronization state machine. Prior to PSync and SFC verification, the ONU increments the local SFC value by 1. The first incoming 64-bit sequence at the boundary of a downstream PHY frame is considered a PSync field, whereas the subsequent 64-bit sequence is considered an SFC structure. The PSync verification is successful if at least 62 bits of the incoming 64-bit sequence match the fixed PSync pattern; otherwise, the PSync verification fails. The SFC verification is successful if the incoming 64-bit sequence forms a valid (error-free or correctable) HEC-protected field, and the incoming SFC value is equal to the locally stored (and just incremented) SFC value; otherwise, the SFC verification fails.

Once in the Pre-Sync state, the ONU transitions to the Sync state if both PSync verification and SFC verification are successful, and returns to the Hunt state if either PSync verification or SFC verification fails.

Once in the Sync state, the ONU remains in that state as long both PSync verification and SFC verification are successful, and transitions into the Re-Sync state, if either PSync verification or SFC verification fails.

Once in the Re-Sync state, the ONU transitions back to Sync state if both PSync and SFC are successfully verified once. However, if for M−1 consecutive PHY frames either PSync verification or SFC verification fails, the ONU declares loss of downstream synchronization, discards the local SFC copy, and transitions into the Hunt state. The recommended value of the parameter M is 3.

The existing downstream synchronization methods include downstream synchronization detection, missed downstream synchronization detection and false downstream synchronization detection. The downstream synchronization detection is: after PSync and SFC are verified successfully upon initialization, the ONU transitions from the hunt state to the pre-sync state and the sync state in sequence.

When determining the detection probability of PSync, the adopted mode is: if a PSync codeword received by the ONU is that the number of unmatched bits with PSync stored therein is less than or equal to K, it is determined that PSync is correctly received. PSync is a specific codeword with a length of N bits.

Assuming that the error rate is Pe, the detection probability of PSync, i.e. the probability of correct receiving, is Psync_true with an expression:

$$P_{sync\_true} = \sum_{k=0}^{K} C_N^k (1 - P_e)^{N-k} P_e^k \quad (1)$$

In a PON system, not only PSync but also SFC should be considered for downstream synchronization detection, and the total length of an SFC field is 64 bit, which adopts HEC check and may correct 2-bit error. Therefore, the probability PSFC_true of correct receiving of an SFC codeword is a special case when the detection probability of PSync is N=64 and K=2. Meanwhile, when entering the pre-sync state from the hunt state in the downstream of the PON system, PSync is also required to be accurately matched, i.e. a special case when the detection probability Psync_true is K=0. Therefore, the detection probability in the pre-sync state is:

$$P_{true\_PON\_presync} = P_{sync\_true(K=0)} * P_{sync\_true(N=64,K=2)} \quad (2)$$

Further, when successfully transitioning from the pre-sync state to the sync state, it is required that PSync and SFC can be correctly received at the same time in the next frame entering the pre-sync state. Therefore, the detection probability in the sync state is:

$$P_{true\_PON\_sync} = P_{true\_PON\_presync} * P_{sync\_true} * P_{sync\_true\ (N=64,K=2)} \quad (3)$$

Based on the above formulas (2) and (3), assuming that N=64, K=2 and Pe=0.02 in a 50GPON system, the detection probability of the downstream pre-sync state is 0.2370, the detection probability of the sync state is 0.1766, and the detection probability is low, as shown in Table 1.

TABLE 1

| K | Detection probability of pre-sync state | Detection probability of sync state |
|---|---|---|
| 0 | 0.236954529 | 0.056147449 |
| 1 | 0.236954529 | 0.129482892 |
| 2 | 0.236954529 | 0.176627105 |
| 3 | 0.236954529 | 0.196511059 |
| 4 | 0.236954529 | 0.202699433 |
| 5 | 0.236954529 | 0.204214953 |

The missed downstream synchronization detection means that after the PON system enters the sync state, since PSync and/or SFC are not correctly detected, the system falsely enters the re-sync state or the hunt state.

Likewise, if a PSync codeword received by the ONU is that the number of unmatched bits with PSync stored therein is less than or equal to K, it is determined that PSync is correctly received.

Assuming that the error rate is Pe, the probability of correct receiving in the sync state is Psync_true, and then an expression of the probability of missed detection Pmiss_sync is:

$$P_{mass\_sync} == 1 - P_{sync\_true} = 1 - \sum_{k=0}^{K} C_N^k (1 - P_e)^{N-k} P_e^k \quad (4)$$

In the PON system, not only PSync but also SFC should be considered for missed downstream synchronization detection, and the probability PSFC_true of correct receiving of an SFC codeword is a special case when the detection probability of PSync is N=64 and K=2. Therefore, the probability Ptrue of a single simultaneous correct detection of PSync and SFC is:

$$P_{true}=P_{sync\_true}*P_{SFC\_true}=P_{sync\_true}*P_{sync\_true(N=64, K=2)} \quad (5)$$

The probability of a single missed detection of PSync and SFC is:

$$P_{miss}=1-P_{true} \quad (6)$$

The probability of M consecutive missed detections of PSync or SFC, i.e. the probability of missed downstream synchronization detection Pmiss_PON_sync is:

$$P_{miss\_PON\_sync}=P_{miss}^M \quad (7)$$

Based on Formula (7), assuming that N=64, K=2, M=3, and Pe=0.01 in the 50GPON system, the probability of missed downstream synchronization detection is 1.43E−4, with an average missed detection every 2.77E−8 years, as shown in Table 2.

TABLE 2

| K | Probability of missed synchronization detection | Average missed detection time (in years) |
|---|---|---|
| 2 | 1.43E−04 | 2.77E−08 |
| 3 | 2.80E−05 | 1.42E−07 |
| 4 | 1.96E−05 | 2.02E−07 |
| 5 | 1.87E−05 | 2.12E−07 |
| 6 | 1.86E−05 | 2.13E−07 |
| 7 | 1.86E−05 | 2.13E−07 |
| 8 | 1.86E−05 | 2.13E−07 |
| 9 | 1.86E−05 | 2.13E−07 |
| 10 | 1.86E−05 | 2.13E−07 |

When N=64, K=2, M=3, and Pe=0.02, the probability of missed downstream synchronization detection is 1.65E−2, with an average missed detection every 2.4E−10 years, as shown in Table 3.

TABLE 3

| K | Probability of missed synchronization detection | Average missed detection time (in years) |
|---|---|---|
| 2 | 1.65E−02 | 2.40E−10 |
| 3 | 4.97E−03 | 7.97E−10 |
| 4 | 3.02E−03 | 1.31E−09 |
| 5 | 2.64E−03 | 1.50E−09 |
| 6 | 2.56E−03 | 1.55E−09 |
| 7 | 2.55E−03 | 1.55E−09 |
| 8 | 2.55E−03 | 1.55E−09 |
| 9 | 2.55E−03 | 1.55E−09 |
| 10 | 2.55E−03 | 1.55E−09 |

As can be seen from Tables 2 and 3, even if K is increased to 10, the probability of missed detection of 50G PON is still large, and when K is greater than 6, the probability of missed detection is not substantially reduced.

The false downstream synchronization detection refers to the probability that PSync and SFC are falsely detected in the hunt state after the ONU is initialized, so as to transitions to the pre-sync state and the sync state in sequence.

In a manner similar to that described above, PSync is a specific codeword received with a length of N bits. When a PSync codeword received by the ONU is that the number of unmatched bits with PSync stored therein is less than or equal to K, it is considered that PSync is correctly received.

Assuming that the error rate is Pe, it is determined that the probability of false detection Pfalse_sync is:

$$P_{false\_sync} = \sum_{i=0}^{K} C_N^i \frac{1}{2^N} \quad (8)$$

Since both downstream PSync and SFC need to be falsely detected in the PON system, false synchronization will occur, and accurate matching of PSync is required for transitioning from the hunt state to the pre-sync state, i.e. K=0, but there are a total of L bits in the length of a downstream frame. When transitions to the pre-sync state, PSync and SFC may occur at any position in the L bits, and therefore the probabilities of false downstream synchronization detection in the pre-sync state and the sync state are respectively:

$$P_{false\_PON\_presync}=(L-N-64)*P_{false\_sync(K=0)}*P_{false\_SFC} \quad (9)$$

$$P_{false\_PON\_sync}=P_{false\_PON\_presync}*P_{false\_sync}*P_{false\_SFC} \quad (10)$$

Based on Formula (10), assuming that N=64, K=2, M=3, and Pe=0.01 in the 50GPON system, the probability of false downstream synchronization detection is 4.84E−61, with an average missed detection every 1.32E42 years, as shown in Table 2.

TABLE 4

| K | Probability of false synchronization detection | Average false detection time (in years) |
|---|---|---|
| 2 | 4.84E−61 | 1.32E+42 |
| 3 | 1.02E−59 | 6.26E+40 |
| 4 | 1.58E−58 | 4.03E+39 |
| 5 | 1.93E−57 | 3.30E+38 |
| 6 | 1.94E−56 | 3.29E+37 |
| 7 | 1.64E−55 | 3.89E+36 |
| 8 | 1.19E−54 | 5.34E+35 |
| 9 | 7.60E−54 | 8.38E+34 |
| 10 | 4.28E−53 | 1.49E+34 |

When N=64, K=2, M=3, and Pe=0.02, the probability of false downstream synchronization detection is 4.84E−61, with an average missed detection every 1.32E42 years, as shown in Table 5.

TABLE 5

| K | Probability of false synchronization detection | Average false detection time (in years) |
|---|---|---|
| 2 | 4.84E−61 | 1.32E+42 |
| 3 | 1.02E−59 | 6.26E+40 |
| 4 | 1.58E−58 | 4.03E+39 |
| 5 | 1.93E−57 | 3.30E+38 |
| 6 | 1.94E−56 | 3.29E+37 |
| 7 | 1.64E−55 | 3.89E+36 |
| 8 | 1.19E−54 | 5.34E+35 |
| 9 | 7.60E−54 | 8.38E+34 |
| 10 | 4.28E−53 | 1.49E+34 |

It can be seen from the above table that as the value of K increases, the probability of false detection also increases, but even if the value of K increases to 10, the probability of false detection of the 50G PON system is still very small.

Based on the above analysis on the detection probability, missed detection probability and false detection probability, it can be seen that for the 50G PON system, when the pre-correction error rate is 0.02, the probability of successful downstream synchronization detection is 17.66%, and a false downstream synchronization loss occurs once every 2.4E−10 years on average, i.e. a false synchronization loss occurs once within 8 ms on average. The probability of downstream synchronization detection is very low, while the probability of missed detection is very high, which will affect the normal operation of the PON system.

Figure 4:
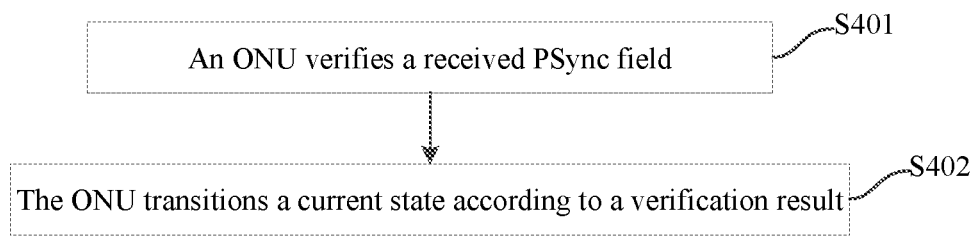
FIG. 4 is a flowchart of state transition according to an embodiment.

Based on the above defects, embodiments of the disclosure provide a state transition method. As shown in FIG. 4, the method includes the following steps.

In S401, an ONU verifies a received PSync field.

The above ONU may be understood as a receiver, which may verify PSync after receiving PSync.

Illustratively, the ONU may verify the PSync field by determining whether the number of error bits of the received PSync field is less than or equal to K, where K is an integer greater than or equal to 0.

In S402, the ONU transitions a current state according to a verification result.

Illustratively, when the ONU determines that the number of error bits of the received PSync field is less than or equal to K, it is determined that the PSync field passes verification. When the ONU determines that the number of error bits of the received PSync field is greater than K, it is determined that the PSync field does not pass verification.

The ONU further transitions the current state according to the acquired verification result.

Optionally, the current state may be any one of a hunt state, a pre-sync state, a sync state, and a re-sync state.

The ONU does not verify a received SFC, but only transitions between different states according to the verification result of PSync, and may allow PSync to have a K-bit error. As such, the probability of downstream synchronization detection can be effectively improved, and the probability of missed downstream synchronization detection can be reduced, thereby ensuring the normal operation of a PON system.

Figure 5:
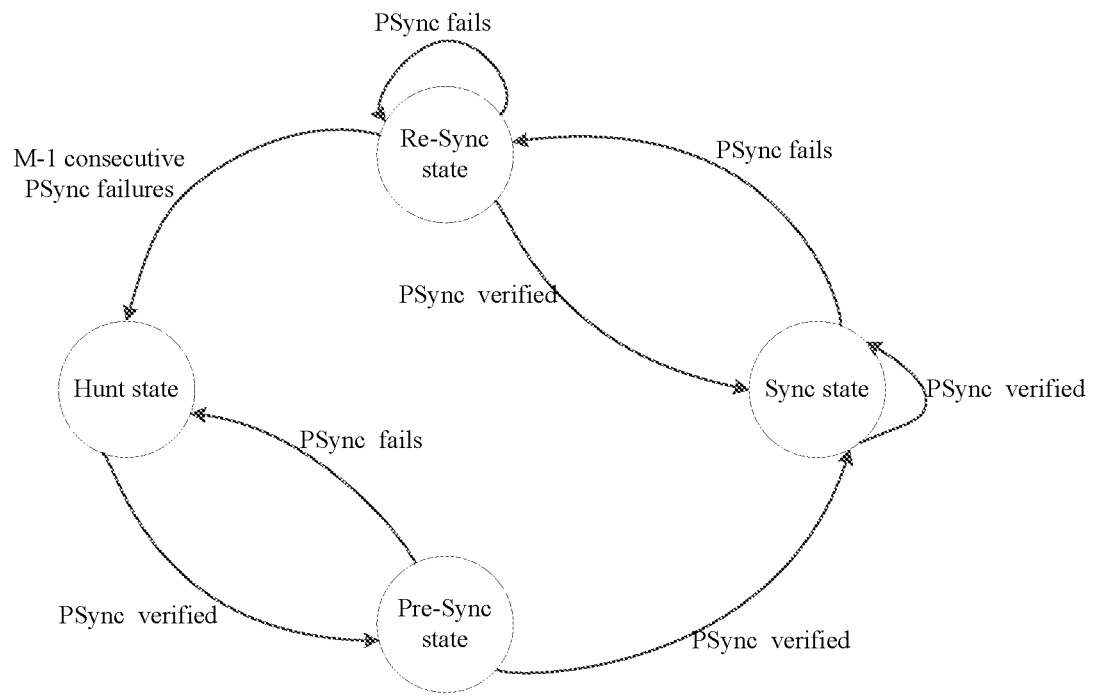
FIG. 5 is a schematic diagram of a downstream frame synchronization state transition process according to an embodiment.

The above verification result is divided into two cases that the verification is passed and the verification is not passed. As shown in FIG. 5, when the verification result is that the verification is passed, i.e. when the number of error bits of PSync received by the ONU is less than or equal to K, the operation that the ONU transitions a current state according to a verification result may include the following operations.

In an example, if the current state is a hunt state, the ONU transitions the hunt state to a pre-sync state.

In an example, if the current state is a pre-sync state, the ONU transitions the pre-sync state to a sync state.

In an example, if the current state is a sync state, the ONU transitions the sync state to a sync state.

In an example, if the current state is a re-sync state, the ONU transitions the re-sync state to a sync state.

When the verification result is that the verification is not passed, i.e. when the number of error bits of PSync received by the ONU is greater than K, the operation that the ONU transitions a current state according to a verification result may include the following operations.

In an example, if the current state is a pre-sync state, the ONU transitions the pre-sync state to a hunt state.

In an example, if the current state is a sync state, the ONU transitions the sync state to a re-sync state.

In an example, if the current state is a re-sync state, the ONU transitions the re-sync state to a re-sync state.

In an example, if the current state is a re-sync state and M−1 consecutive verification results are that the verification is not passed, the ONU transitions the re-sync state to a hunt state, where M is an integer greater than 1.

Assuming that the error rate is Pe, the probabilities of correctly receiving of PSync in the pre-sync state and the sync state are determined on the basis of the above mode, i.e. the detection probabilities of PSync are respectively:

$$P_{sync\_true} = \sum_{k=0}^{K} C_N^k (1-P_e)^{N-k} P_e^k \quad (11)$$

$$P'_{true\_PON\_presync} = P_{sync\_true} \quad (12)$$

$$P'_{true\_PON\_presync} = P'_{true\_PON\_presync} * P_{sync\_true} = P_{sync\_true}^2 \quad (13)$$

Based on the above formulas (12) and (13), assuming that N=64, M=3 and Pe=0.01 in the 50GPON system, when K=5, the detection probabilities in the pre-sync state and the sync state is 0.99995 and 0.99991, respectively, as shown in Table 6.

TABLE 6

| K | Detection probability of pre-sync state | Detection probability of sync state |
|---|---|---|
| 0 | 0.525596488 | 0.276251668 |
| 1 | 0.865376035 | 0.748875682 |
| 2 | 0.973487709 | 0.94767832 |
| 3 | 0.996056476 | 0.992128504 |
| 4 | 0.999532978 | 0.999066175 |
| 5 | 0.999954372 | 0.999908747 |
| 6 | 0.999996228 | 0.999992456 |
| 7 | 0.999999731 | 0.999999462 |
| 8 | 0.999999983 | 0.999999966 |
| 9 | 0.999999999 | 0.999999998 |
| 10 | 1 | 1 |

Assuming that N=64, M=3 and Pe=0.02 in the 50GPON system, when K=7, the detection probabilities in the pre-sync state and the sync state is 0.99996 and 0.99992, respectively, as shown in Table 7.

TABLE 7

| K | Detection probability of pre-sync state | Detection probability of sync state |
|---|---|---|
| 0 | 0.274453545 | 0.075324748 |
| 1 | 0.632923481 | 0.400592132 |
| 2 | 0.86336844 | 0.745405062 |
| 3 | 0.960562912 | 0.922681108 |
| 4 | 0.990812212 | 0.98170884 |
| 5 | 0.998220204 | 0.996443576 |
| 6 | 0.999706842 | 0.999413769 |
| 7 | 0.999958227 | 0.999916455 |
| 8 | 0.99999478 | 0.99998956 |
| 9 | 0.999999422 | 0.999998843 |
| 10 | 0.999999943 | 0.999999885 |

It can be seen that when the state is transitioned, it is only determined whether the PSync verification is passed, but SFC is not verified. When entering the pre-sync state from the hunt state, there is no need to perform accurate matching on PSync, PSync is allowed to have the number of error bits which is less than or equal to K, and therefore the probability of synchronization detection can be improved.

Likewise, based on the above verification mode, the determined probability of missed downstream synchronization detection is:

$$P'_{miss\_PON\_sync} = P'_{miss}{}^M = (1-P'_{true})^M = (1-P_{sync\_true})^M \quad (14)$$

Based on the above formula (14), assuming that N=64, M=3 and Pe=0.01 in the 50GPON system, when K is greater than or equal to 5, the acceptable probability of missed detection can be obtained, and an average missed detection time is 41.7 years, as shown in Table 8.

TABLE 8

| K | Probability of missed synchronization detection | Average missed detection time (in years) |
|---|---|---|
| 2 | 1.86E−05 | 2.13E−07 |
| 3 | 6.13E−08 | 6.46E−05 |
| 4 | 1.02E−10 | 3.89E−02 |
| 5 | 9.50E−14 | 4.17E+01 |
| 6 | 5.37E−17 | 7.39E+04 |
| 7 | 1.94E−20 | 2.04E+08 |
| 8 | 4.72E−24 | 8.40E+11 |
| 9 | 7.94E−28 | 4.99E+15 |
| 10 | 9.53E−32 | 4.16E+19 |

Assuming that N=64, M=3 and Pe=0.02 in the 50GPON system, when K is greater than or equal to 7, the acceptable probability of missed detection can be obtained, and an average missed detection time is 54.4 years, as shown in Table 9.

TABLE 9

| K | Probability of missed synchronization detection | Average missed detection time (in years) |
|---|---|---|
| 2 | 2.55E−03 | 1.55E−09 |
| 3 | 6.13E−05 | 6.46E−08 |
| 4 | 7.76E−07 | 5.11E−06 |
| 5 | 5.64E−09 | 7.03E−04 |
| 6 | 2.52E−11 | 1.57E−01 |
| 7 | 7.29E−14 | 5.44E+01 |
| 8 | 1.42E−16 | 2.79E+04 |
| 9 | 1.93E−19 | 2.05E+07 |
| 10 | 1.88E−22 | 2.11E+10 |

When the sync state is transitioned to the re-sync state or the hunt state, only PSync is verified instead of SFC, so that the problem of high probability of missed downstream synchronization detection due to high probability of missed SFC detection can be avoided, thereby reducing the probability of missed downstream synchronization detection.

Further, since the downstream synchronization detection determination condition changes, PSync is allowed to have a K-bit error, and SFC is no longer detected. Then the probabilities of false downstream synchronization detection in the pre-sync state and the sync state are respectively:

$$P'_{false\_PON\_presync} = (L-N) * P_{false\_sync} \quad (15)$$

$$P'_{false\_PON\_sync} = P'_{false\_PON\_presync} * P_{false\_sync} \quad (16)$$

Based on Formula (16), assuming that N=64, M=3, and Pe=0.01 in the 50GPON system, when K is equal to 5, the probability of false downstream synchronization detection is 2.03E−25, with an average missed detection every 3.14E6 years, as shown in Table 9.

TABLE 9

| K | Probability of false synchronization detection | Average false detection time (in years) |
|---|---|---|
| 2 | 1.27E−32 | 5.01E+13 |
| 3 | 5.62E−30 | 1.13E+11 |
| 4 | 1.36E−27 | 4.70E+08 |
| 5 | 2.03E−25 | 3.14E+06 |
| 6 | 2.04E−23 | 3.13E+04 |
| 7 | 1.46E−21 | 4.37E+02 |
| 8 | 7.74E−20 | 8.24E+00 |

TABLE 9-continued

| K | Probability of false synchronization detection | Average false detection time (in years) |
|---|---|---|
| 9 | 3.14E−18 | 2.03E−01 |
| 10 | 9.97E−17 | 6.39E−03 |

When N=64, K=2, M=3, and Pe=0.02, when K is equal to 7, the probability of false downstream synchronization detection is 1.46E−21, with an average missed detection every 437 years, as shown in Table 10.

TABLE 10

| K | Probability of false synchronization detection | Average false detection time (in years) |
|---|---|---|
| 2 | 1.27E−32 | 5.01E+13 |
| 3 | 5.62E−30 | 1.13E+11 |
| 4 | 1.36E−27 | 4.70E+08 |
| 5 | 2.03E−25 | 3.14E+06 |
| 6 | 2.04E−23 | 3.13E+04 |
| 7 | 1.46E−21 | 4.37E+02 |
| 8 | 7.74E−20 | 8.24E+00 |
| 9 | 3.14E−18 | 2.03E−01 |
| 10 | 9.97E−17 | 6.39E−03 |

Figure 6:
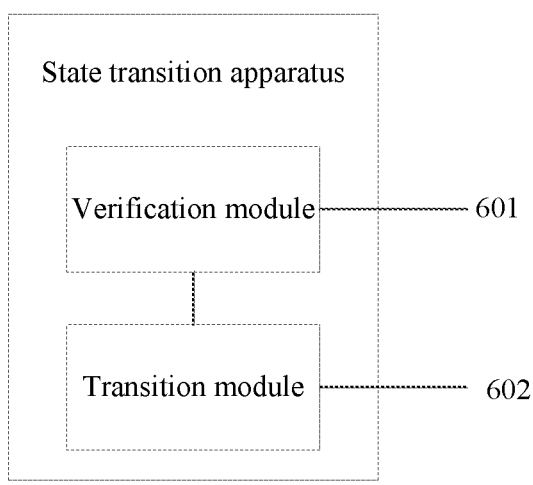
FIG. 6 is a schematic structure diagram of a state transition apparatus according to an embodiment.

FIG. 6 is a schematic structure diagram of a state transition apparatus according to an embodiment. As shown in FIG. 6, the apparatus includes a verification module 601 and a transition module 602.

The verification module is configured to verify a received PSync field.

The transition module is configured to transition a current state according to a verification result.

The current state is any one of a hunt state, a pre-sync state, a sync state, and a re-sync state.

Further, the state transition apparatus may further include a determination module.

The determination module is configured to: determine, when the number of error bits of the received PSync is less than or equal to K, that PSync verification is passed;

or, determine, when the number of error bits of the received P Sync is greater than K, that the PSync verification is not passed, where K is an integer greater than or equal to 0.

In an example, when the verification result is that the verification is passed, the transition module is configured to: transition the hunt state to a pre-sync state when the current state is a hunt state;

or, transition the pre-sync state to a sync state when the current state is a pre-sync state;

or, transition the sync state to a sync state when the current state is a sync state;

or, transition the re-sync state to a sync state when the current state is a re-sync state.

In an example, when the verification result is that the verification is not passed, the transition module is configured to: transition the pre-sync state to a hunt state when the current state is a pre-sync state;

or, transition the sync state to a re-sync state when the current state is a sync state;

or, transition the re-sync state to a re-sync state when the current state is a re-sync state;

or, transition the re-sync state to a hunt state when the current state is a re-sync state and M−1 consecutive verification results are that the verification is not passed, where M is an integer greater than 1.

Further, M may have a value of 3.

In an example, when a system pre-correction error rate is 0.01, a value range of K is 5≤K≤8; or, when a system pre-correction error rate is 0.02, a value range of K is 7≤K≤8.

In an example, the number of bits of the PSync field is N, where N has a value of 64.

Figure 7:
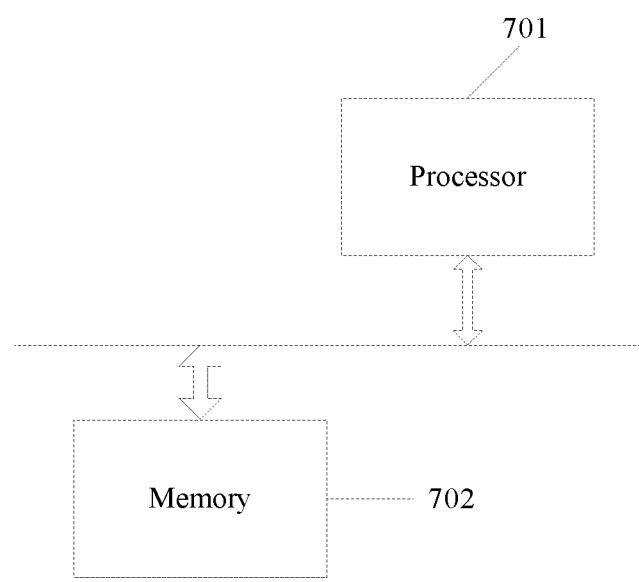
FIG. 7 is a schematic structure diagram of a device according to an embodiment.

FIG. 7 is a schematic structure diagram of a device according to an embodiment. As shown in FIG. 7, the device includes a processor 701 and a memory 702. There may be one or more processors 701 in the device. For example, there is one processor 701 in FIG. 7. The processor 701 and the memory 702 in the device may be connected via a bus or other means. For example, the processor and the memory are connected via a bus in FIG. 7.

The memory 702 is a computer-readable storage medium that may be used to store software programs, computer-executable programs, and modules, such as program instructions/modules (e.g. the verification module 601 and the transition module 602 in FIG. 6) corresponding to the network access method in the embodiment of the disclosure in FIG. 1. The processor 701 implements the state transition method described above by running software programs, instructions, and modules stored in the memory 702.

The memory 702 may mainly include a storage program area and an storage data area, where the storage program area may store an operating system and an application required for at least one function. The storage data area may store data created according to usage of the device, etc. In addition, the memory 702 may include a high-speed random access memory, and may further include a non-volatile memory such as a disk storage device, a flash device, or other non-volatile solid storage devices.

Embodiments of the disclosure also provide a storage medium including computer-executable instructions for performing a network access method when executed by a computer processor. The method includes the following steps.

An ONU verifies a received PSync field.

The ONU transitions a current state according to a verification result.

The above description is only an exemplary embodiment of the disclosure and is not intended to limit the scope of the disclosure.

In general, the various embodiments of the disclosure may be implemented in hardware or special purpose circuits, software, logic, or any combination thereof. For example, some aspects may be implemented in hardware, while other aspects may be implemented in firmware or software which may be executed by a controller, microprocessor or other computing devices, although the disclosure is not limited thereto.

The embodiments of the disclosure may be implemented by a data processor of an information transmission apparatus executing computer program instructions, for example in a processor entity, or by hardware, or by a combination of software and hardware. The computer program instruction may be an assembly instruction, an Instruction Set Architecture (ISA) instruction, a machine instruction, a machine related instruction, a microcode, a firmware instruction, state setting data or a source code or target code edited by one or any combination of more programming languages.

The block diagrams of any logic flow in the drawings of the disclosure may represent program steps, or may represent interconnected logic circuits, modules, and functions, or may represent a combination of program steps and logic circuits, modules, and functions. The computer program may be stored on a memory. The memory may be of any type suitable to a local technical environment and may be implemented using any suitable data storage technology, such as but not limited to a Read Only Memory (ROM), a Random Access Memory (RAM), and optical memory devices and systems (digital versatile disk DVD or CD-ROM). The computer readable medium may include a non-transitory storage medium. The data processor may be of any type suitable to the local technical environment, such as, but not limited to, a processor of a general purpose computer, a special purpose computer, a microprocessor, a Digital Signal Processor (DSP), an Application Specific Integrated Circuit (ASIC), and a Field Programmable Gate Array (FPGA) core processor architecture.

A detailed description of exemplary embodiments of the disclosure has been provided above by way of exemplary and non-limiting examples. However, various modifications and adaptations to the above embodiments may become apparent to those skilled in the art, when considered in conjunction with the accompanying drawings and claims, without departing from the scope of the disclosure. Accordingly, the proper scope of the disclosure will be determined according to the claims.

What is claimed is:

1. A state transition method, comprising:
   verifying, by an Optical Network Unit (ONU), a received Physical Synchronization Sequence (PSync) field; and
   only transitioning, by the ONU, a current state according to a verification result, wherein the current state is any one of a hunt state, a pre-sync state, a sync state, and a re-sync state, wherein transitioning, by the ONU, a current state according to a verification result comprises:
   when the current state is a hunt state and the verification result is that the verification is passed, transitioning, by the ONU, the hunt state to a pre-sync state;
   or, when the current state is a pre-sync state and the verification result is that the verification is passed, transitioning, by the ONU, the pre-sync state to a sync state;
   or, when the current state is a sync state and the verification result is that the verification is passed, transitioning, by the ONU, the sync state to a sync state;
   or, when the current state is a re-sync state and the verification result is that the verification is passed, transitioning, by the ONU, the re-sync state to a sync state;
   wherein when a system pre-correction error rate is 0.01, a value range of K is 5≤K≤8;
   or, when a system pre-correction error rate is 0.02, a value range of K is 7≤K≤8.

2. The method according to claim 1, wherein the ONU determines the verification result comprises:
   when the ONU determines that a number of error bits of the received PSync field is less than or equal to K, determining that the PSync field passes verification; and
   when the ONU determines that the number of error bits of the received PSync field is greater than K, determining that the PSync field does not pass verification, K being an integer greater than or equal to 0.

3. The method according to claim 2, wherein the current state is any one of a hunt state, a pre-sync state, a sync state, and a re-sync state.

4. The method according to claim 3, wherein transitioning, by the ONU, a current state according to a verification result comprises:

when the current state is a hunt state and the verification result is that the verification is passed, transitioning, by the ONU, the hunt state to a pre-sync state;

or, when the current state is a pre-sync state and the verification result is that the verification is passed, transitioning, by the ONU, the pre-sync state to a sync state;

or, when the current state is a sync state and the verification result is that the verification is passed, transitioning, by the ONU, the sync state to a sync state;

or, when the current state is a re-sync state and the verification result is that the verification is passed, transitioning, by the ONU, the re-sync state to a sync state.

5. The method according to claim 3, wherein transitioning, by the ONU, a current state according to a verification result comprises:

when the current state is a pre-sync state and the verification result is that the verification is not passed, transitioning, by the ONU, the pre-sync state to a hunt state;

or, when the current state is a sync state and the verification result is that the verification is not passed, transitioning, by the ONU, the sync state to a re-sync state;

or, when the current state is a re-sync state and the verification result is that the verification is not passed, transitioning, by the ONU, the re-sync state to a re-sync state;

or, when the current state is a re-sync state and M−1 consecutive verification results are that the verification is not passed, transitioning, by the ONU, the re-sync state to a hunt state, M being an integer greater than 1.

6. A device, comprising: a memory, a processor and a computer program, and the computer program is stored on the memory and is runnable on the processor, wherein the processor, when executing the computer program, implements the state transition method as claimed in claim 2.

7. A non-transitory computer-readable storage medium, storing a computer program which, when executed by a processor, implements the state transition method as claimed in claim 2.

8. The method according to claim 1, wherein transitioning, by the ONU, a current state according to a verification result comprises: when the current state is a pre-sync state and the verification result is that the verification is not passed, transitioning, by the ONU, the pre-sync state to a hunt state; or, when the current state is a sync state and the verification result is that the verification is not passed, transitioning, by the ONU, the sync state to a re-sync state; or, when the current state is a re-sync state and the verification result is that the verification is not passed, transitioning, by the ONU, the re-sync state to a re-sync state; or, when the current state is a re-sync state and M−1 consecutive verification results are that the verification is not passed, transitioning, by the ONU, the re-sync state to a hunt state, M being an integer greater than 1.

9. The method according to claim 8, wherein when a system pre-correction error rate is 0.01, a value range of K is $5 \leq K \leq 8$;

or, when a system pre-correction error rate is 0.02, a value range of K is $7 \leq K \leq 8$.

10. The method according to claim 1, wherein a number of bits of the PSync field is N, a value of N being 64, and a value of M being 3.

11. A device, comprising: a memory, a processor and a computer program, and the computer program is stored on the memory and is runnable on the processor, wherein the processor, when executing the computer program, implements the state transition method as claimed in claim 1.

12. A non-transitory computer-readable storage medium, storing a computer program which, when executed by a processor, implements the state transition method as claimed in claim 1.

13. A device, comprising: a memory, a processor and a computer program, and the computer program is stored on the memory and is runnable on the processor, wherein the processor, when executing the computer program, implements the state transition method as claimed in claim 1.

14. A non-transitory computer-readable storage medium, storing a computer program which, when executed by a processor, implements the state transition method as claimed in claim 1.

15. A state transition apparatus, comprising:

a verification module, configured to verify a received Physical Synchronization Sequence (PSync) field; and a transition module, configured to only transition a current state according to a verification result, wherein the current state is any one of a hunt state, a pre-sync state, a sync state, and a re-sync state, wherein the transition module, configured to transition, by the ONU, the hunt state to a pre-sync state; when the current state is a hunt state and the verification result is that the verification is passed;

or, transition, by the ONU, the pre-sync state to a sync state when the current state is a pre-sync state and the verification result is that the verification is passed;

or, transition, by the ONU, the sync state to a sync state when the current state is a sync state and the verification result is that the verification is passed;

or, transition, by the ONU, the re-sync state to a sync state when the current state is a re-sync state and the verification result is that the verification is passed;

wherein when a system pre-correction error rate is 0.01, a value range of K is $5 \leq K \leq 8$;

or, when a system pre-correction error rate is 0.02, a value range of K is $7 \leq K \leq 8$.

* * * * *